US012000476B2

(12) United States Patent
Murakami (10) Patent No.: US 12,000,476 B2
(45) Date of Patent: Jun. 4, 2024

(54) METHOD OF CORRECTING ANGULAR TRANSMISSION ERROR FOR REDUCER AND ROBOT SYSTEM

(71) Applicant: Seiko Epson Corporation, Tokyo (JP)

(72) Inventor: Naoto Murakami, Matsumoto (JP)

(73) Assignee: SEIKO EPSON CORPORATION (JP)

(*) Notice: Subject to any disclaimer, the term of this patent is extended or adjusted under 35 U.S.C. 154(b) by 308 days.

(21) Appl. No.: 17/588,647

(22) Filed: Jan. 31, 2022

(65) Prior Publication Data
US 2022/0243807 A1    Aug. 4, 2022

(30) Foreign Application Priority Data

Feb. 1, 2021   (JP) ................................ 2021-014201

(51) Int. Cl.
| | |
|---|---|
| *B25J 9/16* | (2006.01) |
| *F16H 61/12* | (2010.01) |
| *G01B 21/22* | (2006.01) |
| *G01C 19/00* | (2013.01) |

(52) U.S. Cl.
CPC ............ *F16H 61/12* (2013.01); *B25J 9/1694* (2013.01); *G01B 21/22* (2013.01); *G01C 19/00* (2013.01); *F16H 2061/1232* (2013.01); *F16H 2061/1256* (2013.01)

(58) Field of Classification Search
CPC ............ F16H 61/12; F16H 2061/1232; F16H 2061/1256; B25J 9/1694; B25J 9/1628; B25J 19/0095; B25J 9/102; G01B 21/22; G01C 19/00
See application file for complete search history.

(56) References Cited

U.S. PATENT DOCUMENTS

| | | | | |
|---|---|---|---|---|
| 10,502,567 | B2 * | 12/2019 | Fujii | ................. B60W 40/11 |
| 2010/0318223 | A1 * | 12/2010 | Motoyoshi | ............. B25J 9/1638 |
| | | | | 700/258 |
| 2012/0010748 | A1 * | 1/2012 | Sasai | ................. G01C 25/005 |
| | | | | 700/254 |

(Continued)

FOREIGN PATENT DOCUMENTS

| | | |
|---|---|---|
| CN | 103213134 A | 7/2013 |
| JP | 2010-120110 A | 6/2010 |
| JP | 2011-212823 A | 10/2011 |

*Primary Examiner* — David J Bolduc
(74) *Attorney, Agent, or Firm* — Harness, Dickey & Pierce, P.L.C.

(57) ABSTRACT

A method of correcting an angular transmission error for a reducer of creating correction data for correction of an angular transmission error of the reducer in a robot system including an arm, the reducer having an input shaft and an output shaft, a motor, an encoder, and an inertial sensor, includes rotating the arm in an input rotation angular range smaller than a necessary input rotation angular range, measuring and recording the angular transmission error, determining whether or not an accumulated value of measurement times is equal to or larger than a predetermined value, when the accumulated value is smaller than the predetermined value, measuring the angular transmission error of the reducer and updating a record, and, when the accumulated value is equal to or larger than the predetermined value, creating the correction data based on the recorded angular transmission error of the reducer.

6 Claims, 6 Drawing Sheets

(56) References Cited

U.S. PATENT DOCUMENTS

| | | |
|---|---|---|
| 2013/0190926 A1 | 7/2013 | Motoyoshi et al. |
| 2014/0365008 A1* | 12/2014 | Asada ................... B25J 13/088 |
| | | 700/258 |
| 2015/0151432 A1* | 6/2015 | Gomi ..................... B25J 9/1641 |
| | | 700/258 |
| 2015/0328770 A1 | 11/2015 | Motoyoshi et al. |
| 2018/0361592 A1* | 12/2018 | Motoyoshi ............. B25J 9/0087 |
| 2020/0269419 A1* | 8/2020 | Imai .......................... B25J 9/12 |

\* cited by examiner

| AMPLITUDE | A1 | | | |
|---|---|---|---|---|
| PHASE VALUE | φ1 | φ2 | ... | φn |
| AVERAGE VALUE OF MEASURED ANGULAR TRANSMISSION ERRORS | D1 | D2 | ... | Dn |

METHOD OF CORRECTING ANGULAR TRANSMISSION ERROR FOR REDUCER AND ROBOT SYSTEM

The present application is based on, and claims priority from JP Application Serial Number 2021-014201, filed Feb. 1, 2021, the disclosure of which is hereby incorporated by reference herein in its entirety.

BACKGROUND

1. Technical Field

The present disclosure relates to a method of correcting an angular transmission error for a reducer and a robot system.

2. Related Art

For a drive unit that drives a joint portion of a robot arm, a motor and a reducer coupled to the motor are used. As a reducer, a wave gear reducer is known. The wave gear reducer contains an angular transmission error in principle. The angular transmission error causes reduction of drive accuracy of the joint portion of the robot arm.

JP-A-2010-120110 discloses a method of calculating an amount of transmission error correction, when a servo motor is rotationally driven and torque is transmitted to a drive shaft of a robot arm via a reducer, for correcting an angular transmission error of the reducer. In this method, first, teaching to rotate the drive shaft at a predetermined velocity over an entire range of a rotatable angle is performed to a control apparatus of the robot. Then, when the drive shaft is rotated according to the teaching, a rotation angle of the drive shaft is measured using position measuring means placed outside and recorded as measurement angle data. Further, motor rotation angle data detected by an encoder coupled to the servo motor is also recorded. Then, the amount of transmission error correction is calculated based on a difference between the measurement angle data and the motor rotation angle data.

According to the method, the angular transmission error of the reducer may be measured and an amount of correction for correcting the error may be calculated.

In the method disclosed in JP-A-2010-120110, when the angular transmission error is measured, it is necessary to rotate the drive shaft of the robot arm over the entire range of the rotatable angle. However, depending on an environment in which the robot is used, a motion range of the robot arm may be limited. In this case, it may be impossible to rotate the drive shaft of the robot arm over the entire range of the rotatable angle. Accordingly, it may be impossible to accurately calculate the amount of transmission error correction.

SUMMARY

A method of correcting an angular transmission error for a reducer according to an application example of the present disclosure is a method of correcting an angular transmission error for a reducer of creating correction data for correcting an angular transmission error of the reducer in a robot system including an arm, the reducer having an input shaft and an output shaft coupled to the arm, a motor coupled to the input shaft and generating power for rotating the arm via the reducer, an encoder detecting a rotation angular position of the input shaft, and an inertial sensor provided in the arm and detecting a rotation angular velocity of the arm, and the method includes rotating the arm in an input rotation angular range smaller than a necessary input rotation angular range of the input shaft necessary for creation of the correction data, when the arm rotates in the input rotation angular range, measuring and recording the angular transmission error of the reducer based on an output value from the encoder and an output value from the inertial sensor, using a time when the angular transmission error of the reducer is measured or an angular range in which the angular transmission error of the reducer is measured as an index, determining whether or not an accumulated value of the indexes is equal to or larger than a predetermined value, when the accumulated value of the indexes is smaller than the predetermined value, measuring the angular transmission error of the reducer and updating a record, and, when the accumulated value of the indexes is equal to or larger than the predetermined value, creating the correction data based on the recorded angular transmission error of the reducer.

A robot system according to an application example of the present disclosure includes an arm, a reducer having an input shaft and an output shaft coupled to the arm, a motor coupled to the input shaft and generating power for rotating the arm via the reducer, an encoder detecting a rotation angular position of the input shaft, an inertial sensor provided in the arm and detecting a rotation angular velocity of the arm, and a control apparatus creating correction data for correction of the angular transmission error of the reducer, wherein the control apparatus rotates the arm in an input rotation angular range smaller than a necessary input rotation angular range of the input shaft necessary for creation of the correction data, when the arm rotates in the input rotation angular range, measures and records the angular transmission error of the reducer based on an output value from the encoder and an output value from the inertial sensor, using a time when the angular transmission error of the reducer is measured or an angle at which the angular transmission error of the reducer is measured as an index, determines whether or not an accumulated value of the indexes is equal to or larger than a predetermined value, when the accumulated value of the indexes is smaller than the predetermined value, measures the angular transmission error of the reducer and updates a record, and, when the accumulated value of the indexes is equal to or larger than the predetermined value, creates the correction data based on the recorded angular transmission error of the reducer.

DESCRIPTION OF EXEMPLARY EMBODIMENTS

As below, a method of correcting an angular transmission error for a reducer and a robot system according to the present disclosure will be explained in detail according to preferred embodiments shown in the accompanying drawings.

1. Robot System

First, a robot system according to an embodiment is explained.

Figure 1:
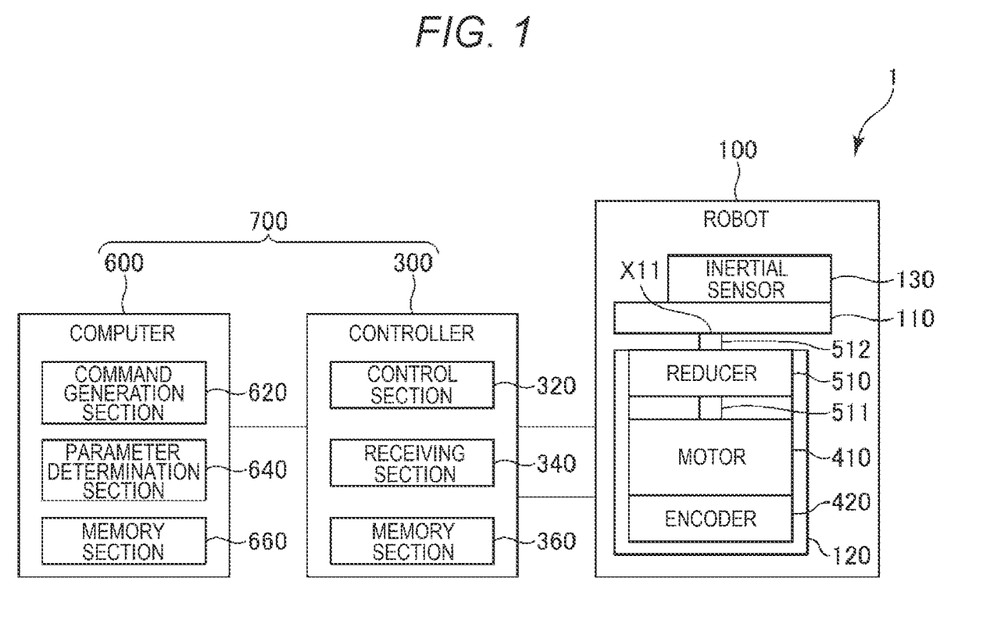
FIG. 1 is a schematic diagram showing a robot system according to an embodiment.
Figure 2:
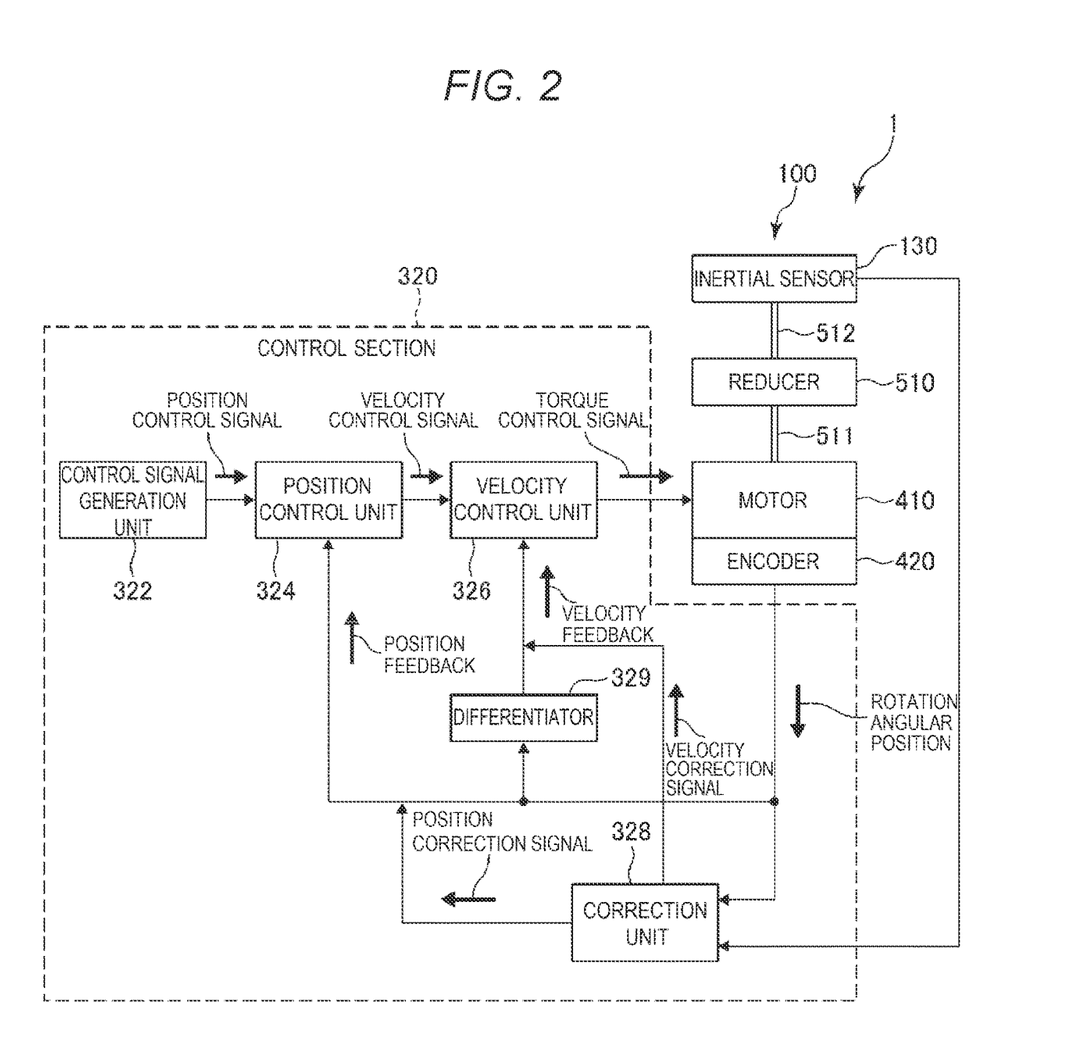
FIG. 2 is a functional block diagram of the robot system shown in FIG. 1.

FIG. 1 is a schematic diagram showing the robot system according to the embodiment. FIG. 2 is a functional block diagram of the robot system shown in FIG. 1.

A robot system 1 includes a robot 100 and a control apparatus 700. The control apparatus 700 includes a controller 300 and a computer 600. The configuration of the robot system 1 is not limited to that, but the controller 300 and the computer 600 may be integrated, for example.

The robot 100 is a single-axis robot including an arm 110 having a rotary joint X11. The rotary joint X11 is a twisting joint. The robot 100 may move the arm 110 to a designated position in a three-dimensional space by rotating the rotary joint X11. Note that the robot 100 according to the embodiment includes only the rotary joint X11, however, the present disclosure can be applied to a multi-axis robot having a plurality of rotary joints.

As shown in FIG. 1, the robot 100 includes a motor 410, an encoder 420, a reducer 510, an inertial sensor 130, and a frame 120. The motor 410, the encoder 420, and the reducer 510 are attached to the frame 120.

The reducer 510 includes an input shaft 511 and an output shaft 512. The reducer 510 converts rotation input to the input shaft 511 into rotation output having a lower rotation angular velocity than the rotation input and rotates the output shaft 512. The reducer 510 includes e.g. a wave gear reducer and a planetary gear reducer. Particularly, the wave gear reducer is preferably used.

The motor 410 generates power according to a motor control signal output from the controller 300. The input shaft 511 of the reducer 510 rotates by the power generated by the motor 410.

The encoder 420 detects a rotation angular position of the input shaft 511 of the reducer 510. That is, the encoder 420 detects a rotation angular position of an output shaft of the motor 410 coupled to the input shaft 511. The rotation angular position of the input shaft 511 detected by the encoder 420 is transmitted to the controller 300. The encoder 420 includes e.g. an optical rotary encoder, a magnetic rotary encoder, and an electromagnetic induction rotary encoder.

The arm 110 is coupled to the output shaft 512 of the reducer 510. Thereby, the arm 110 rotates by the rotation output of the output shaft 512 in the rotary joint X11 via the reducer 510.

The inertial sensor 130 is attached to the arm 110. The inertial sensor 130 detects information necessary for calculation of a rotation angular velocity of the arm 110. The inertial sensor 130 includes e.g. a gyro sensor that detects the rotation angular velocity, an acceleration sensor that detects an acceleration, and an IMU (Inertial Measurement Unit) that detects both the rotation angular velocity and the acceleration. When the acceleration sensor is used, the rotation angular velocity may be calculated based on the detected acceleration and a detection time.

Here, when converting the rotation input to the input shaft 511 into rotation output and transmitting the rotation output to the output shaft 512, the reducer 510 generates a periodic angular transmission error. That is, for example, when the motor 410 continuously provides rotation input at a constant velocity to the input shaft 511, a rotation angular velocity and a rotation angular position in the output shaft 512 of the reducer 510 contain periodic differences. Accordingly, in the controller 300, periodic differences, i.e., changes of the angular transmission error are detected and correction data for correcting the differences is created. The motor 410 is driven based on a motor control signal on which the correction data is reflected, and thereby, accuracy reduction of the rotation angular position of the output shaft 512 caused by the angular transmission error is corrected. "Correction" in this specification refers to control of rotation input provided to the input shaft 511 so that rotation angular position "differences" of the output shaft 512 due to the angular transmission error may be compensated for and an intended rotation angular position may be obtained.

The controller 300 is a device that controls operation of the robot 100. The controller 300 is electrically coupled to the robot 100.

Figure 3:
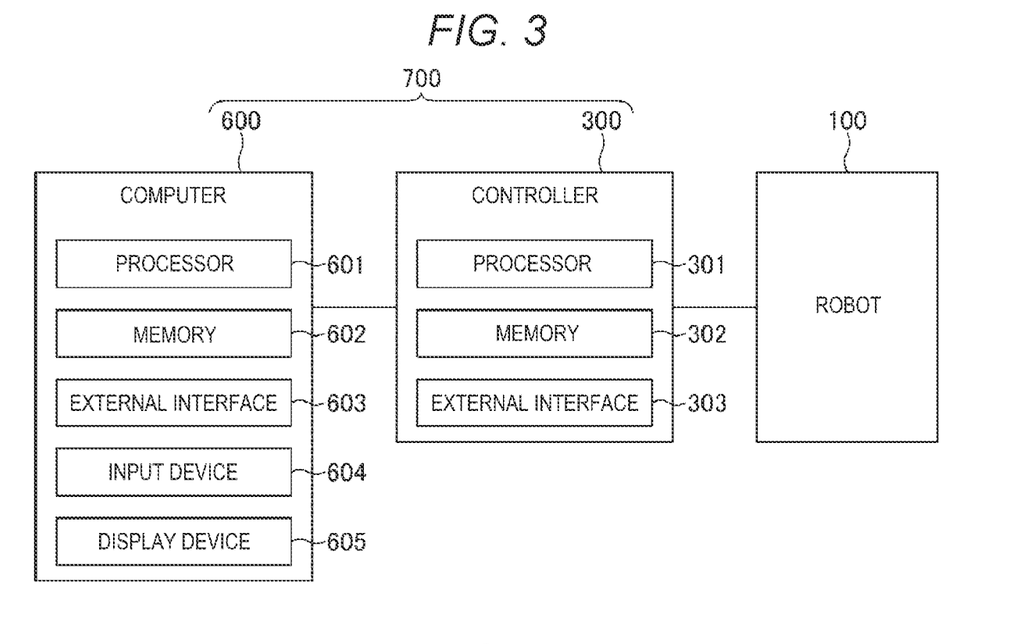
FIG. 3 shows an example of hardware configurations of a controller and a computer shown in FIG. 2.

FIG. 3 shows an example of hardware configurations of the controller 300 and the computer 600 shown in FIG. 2.

The controller 300 includes a processor 301, a memory 302, and an external interface 303. These are coupled via an internal bus to communicate with one another.

The computer 600 includes a processor 601, a memory 602, and an external interface 603. These are coupled via an internal bus to communicate with one another.

The processors 301, 601 include e.g. CPUs (Central Processing Units), FPGAs (Field-Programmable Gate Arrays), and ASICs (Application Specific integrated Circuits). The processor 301 realizes various functions, which will be described later, by reading and executing programs stored in the memory 302. The processor 601 determines parameters etc. used for the operation of the robot 100 based on information output from the controller 300. Then, the computer 600 controls the controller 300 to store the parameters. The controller 300 generates a control signal output to the robot 100 using the parameters.

The memories 302, 602 include e.g. volatile memories such as RAMs (Random Access Memories) and nonvolatile memories such as ROMs (Read Only Memories). Note that the memories 302, 602 are not limited to non-detachable types, but may have detachable external memory devices or may externally transmit and receive data between the outside and themselves via a network or the like.

The external interfaces 303, 603 include various communication standards. As examples, the external interface includes e.g. USB (Universal Serial Bus), RS-232C, Ethernet (registered trademark), and Wi-Fi (registered trademark).

Further, the computer 600 includes an input device 604 such as a keyboard and a mouse, a display device 605 such as a monitor.

The controller 300 shown in FIG. 1 has a control section 320, a receiving section 340, and a memory section 360 as functional sections. As shown in FIG. 2, the control section 320 has a control signal generation unit 322, a position control unit 324, a velocity control unit 326, and a correction unit 328.

The control signal generation unit 322 generates and outputs a position control signal indicating a target position in which the arm 110 should be located to the position control unit 324.

The position control unit 324 receives the position control signal output from the control signal generation unit 322. Further, the position control unit 324 receives an output value of the encoder 420 of the robot 100 as position feedback. The position control unit 324 generates and outputs a velocity control signal of the motor 410 based on the position control signal and information of the rotation angular position contained in the output value to the velocity control unit 326.

The velocity control unit 326 receives the velocity control signal from the position control unit 324. Further, the velocity control unit 326 receives a differential value obtained by differentiation of the output value of the encoder 420 of the robot 100 using a differentiator 329 as velocity feedback. The velocity control unit 326 generates and outputs a torque control signal of the motor 410 based on the velocity control signal and information of the rotation angular velocity obtained by differentiation of the rotation angular position contained in the output value to the motor 410. An amount of current supplied to the motor 410 is determined based on the torque control signal, and a current in the determined amount of current is supplied to the motor 410.

The correction unit 328 receives information of the rotation angular position of the input shaft 511 output from the encoder 420. The correction unit 328 determines a direction of the rotation of the motor 410 based on the latest rotation angular position of the input shaft 511 and the immediately preceding rotation angular position. Further, the correction unit 328 generates a position correction signal (correction data) according to the direction of rotation, the latest rotation angular position, the period of the angular transmission error, and a phase value of the angular transmission error. Then, the position control unit 324 receives a signal obtained by subtraction of the position correction signal created in the correction unit 328 from the latest rotation angular position as position feedback after correction.

Further, the correction unit 328 generates a velocity correction signal as a differential value of the position correction signal. Then, the velocity control unit 326 receives a signal obtained by subtraction of the velocity correction signal created in the correction unit 328 from the latest rotation angular velocity as velocity feedback after correction.

The computer 600 sets a parameter used when the robot 100 moves for the controller 300.

The computer 600 has a command generation section 620, a parameter determination section 640, and a memory section 660 as functional sections.

The command generation section 620 creates a control signal for instructing measurement operation of the angular transmission error. The parameter determination section 640 determines a parameter for creating correction data based on the measurement value of the angular transmission error. The memory section 660 stores data necessary for determination of the parameter.

Figure 4:
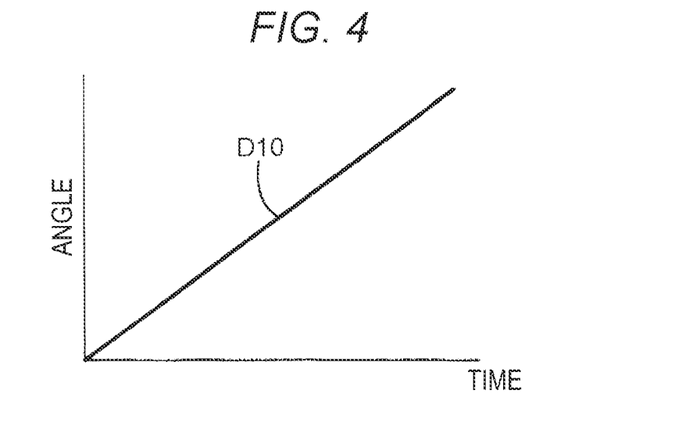
FIG. 4 shows an example of a graph indicating changes with time of a rotation angular position of an input shaft when there is continuous rotation input at a constant velocity to the input shaft of a reducer.
Figure 5:
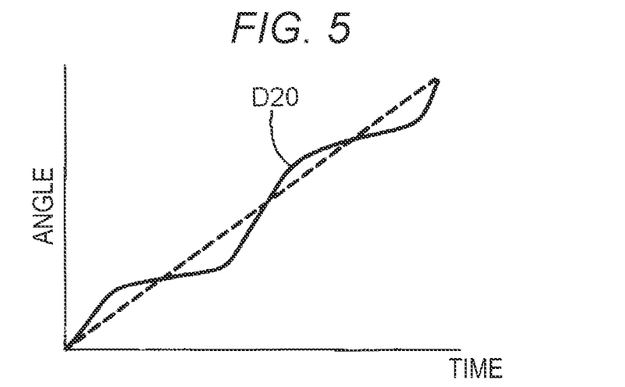
FIG. 5 shows an example of a graph indicating changes with time of a rotation angular position of an output shaft when there is continuous rotation input at a constant velocity to the input shaft of the reducer.

FIG. 4 shows an example of a graph indicating changes with time of a rotation angular position D10 of the input shaft 511 when there is continuous rotation input at a constant velocity to the input shaft 511 of the reducer 510. FIG. 5 shows an example of a graph indicating changes with time of a rotation angular position D20 of the output shaft 512 when there is continuous rotation input at a constant velocity to the input shaft 511 of the reducer 510. The rotation angular position D10 in FIG. 4 and the rotation angular position D20 in FIG. 5 respectively show rotation angular positions when the correction unit 328 does not output a correction signal. Note that the scale of the rotation angular position D20 of the output shaft 512 shown in FIG. 5 and the scale of the rotation angular position D10 of the input shaft 511 shown in FIG. 4 are different.

As described above, in the reducer 510, if the input shaft 511 is rotated at a constant velocity, a periodic transmission error is generated when the rotation is converted and output to the output shaft 512. Accordingly, while the rotation angular position D10 of the input shaft 511 of the reducer 510 increases in proportion to time, the rotation angular position D20 of the output shaft 512 contains a periodic difference from a proportional value to time shown by a broken line in FIG. 5.

Figure 6:
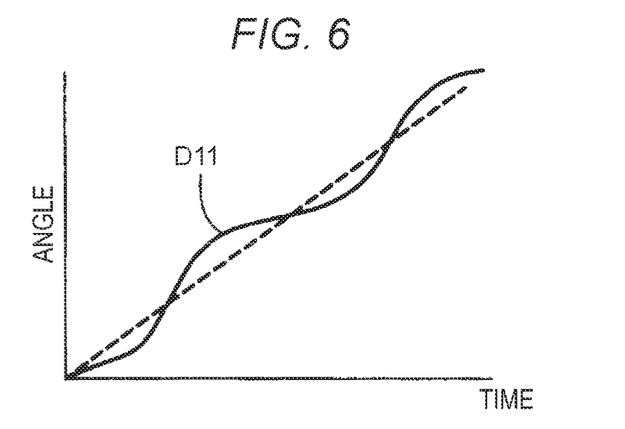
FIG. 6 shows an example of a graph indicating changes with time of a rotation angular position of the input shaft when rotation output at a constant velocity is to be continuously performed from the output shaft of the reducer.
Figure 7:
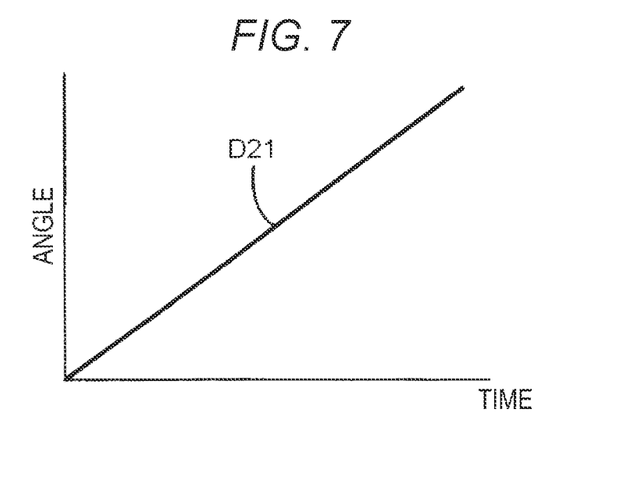
FIG. 7 shows an example of a graph indicating changes with time of a rotation angular position of the output shaft when rotation output at the constant velocity is to be continuously performed from the output shaft of the reducer.

FIG. 6 shows an example of a graph indicating changes with time of a rotation angular position D11 of the input shaft 511 when rotation output at a constant velocity is to be continuously performed from the output shaft 512 of the reducer 510 in the embodiment. FIG. 7 shows an example of a graph indicating changes with time of a rotation angular position D21 of the output shaft 512 when rotation output at a constant velocity is to be continuously performed from the output shaft 512 of the reducer 510 in the embodiment. The rotation angular position D11 shown in FIG. 6 and the rotation angular position D21 shown in FIG. show desirable rotation angular positions when the rotation output at the constant velocity is to be continuously performed from the output shaft 512 of the reducer 510 by functioning of the correction unit 328. Note that the scale of the rotation angular position D21 of the input shaft 512 shown in FIG. 7 and the scale of the rotation angular position D11 of the input shaft 511 shown in FIG. 6 are different. For reference, the rotation angular position D10 shown in FIG. 4 is shown by a broken line in FIG. 6.

Therefore, the position control unit 324 receives a signal obtained by correction of the rotation angular position transmitted from the encoder 420 using the correction unit 328 as position feedback. The velocity control unit 326 receives a signal obtained by correction of the rotation angular velocity obtained by differentiation of the rotation angular position transmitted from the encoder 420 using the correction unit 328 as velocity feedback. When the position control unit 324 generates a velocity control signal based on the position feedback and the velocity control unit 326 generates a torque control signal based on the velocity feedback, the changes with time of the rotation angular position D11 of the input shaft 511 of the reducer 510 are changes having periodic differences relative to the broken line shown in FIG. 6 proportional to time by effects of the correction.

When the rotation input to realize the corrected changes with time of the rotation angular position D11 is performed to the input shaft 511, as shown in FIG. 7, the rotation angular position D21 of the output shaft 512 forms a straight line proportional to time. The correction unit 328 increases accuracy of the rotation angular position D21 of the output shaft 512 based on the principle.

2. Method of Correcting Angular Transmission Error for Reducer

Next, a method of correcting an angular transmission error for a reducer according to an embodiment will be explained. The correction method is performed, for example, immediately after assembly of the reducer 510 or after replacement of the reducer 510 or the motor 410, and thereby, the angular transmission error of the reducer 510 may be properly corrected and the motion accuracy of the robot 100 may be kept higher.

Figure 8:
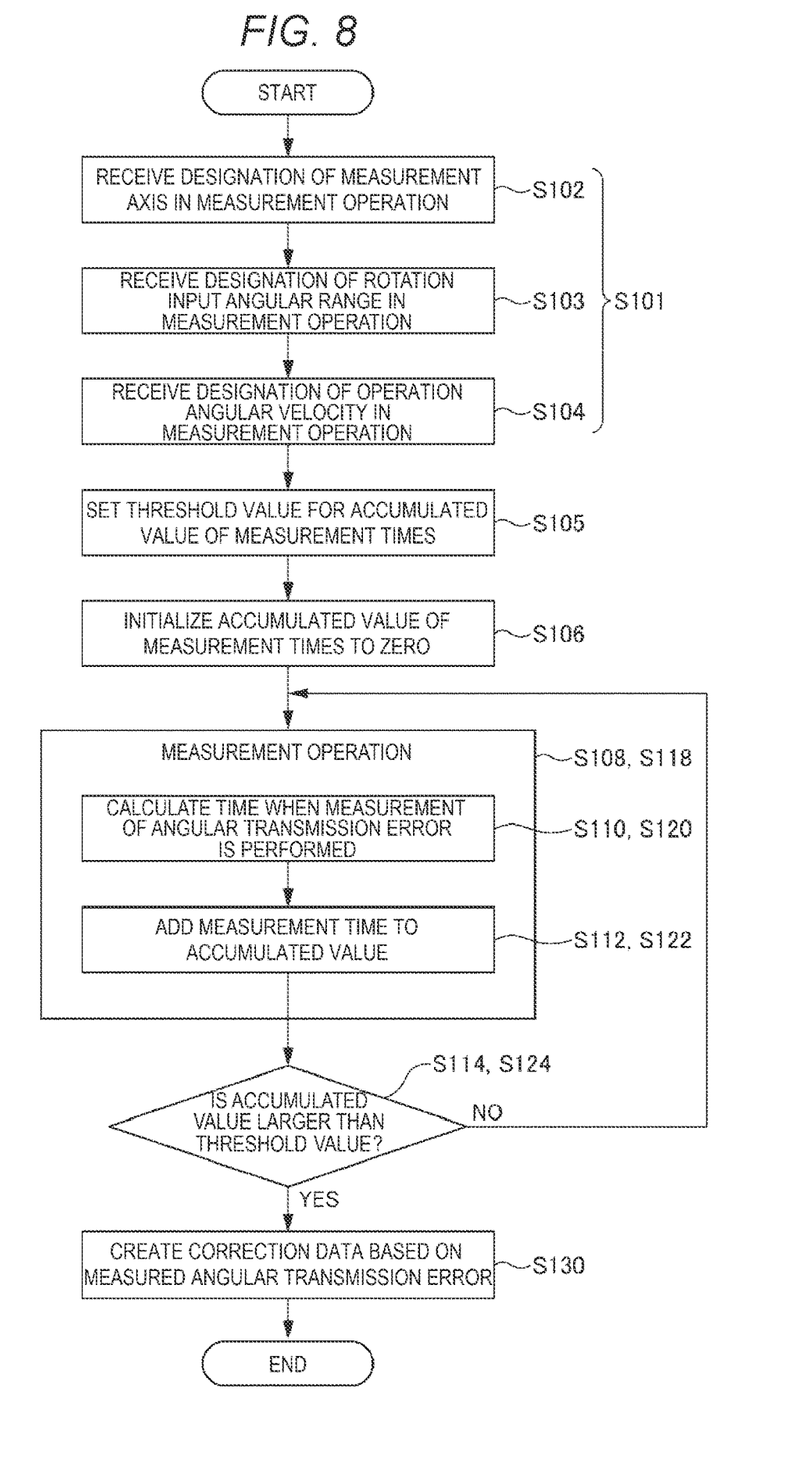
FIG. 8 is a flowchart for explanation of a method of correcting an angular transmission error for a reducer according to an embodiment.

FIG. 8 is a flowchart for explanation of the method of correcting the angular transmission error for the reducer according to the embodiment.

The method of correcting the angular transmission error for the reducer 510 using the above described controller 300 includes a measurement operation instruction step S101, a measurement operation execution step S108, an index determination step S114, a measurement operation execution step S118, and a correction data creation step S130. The flow shown in FIG. 8 is executed by the controller 300 and the robot 100. As below, the respective steps will be sequentially explained.

2.1. Measurement Operation Instruction Step

At the measurement operation instruction step S101, a user instructs a start of operation to measure the angular transmission error for deriving the correction data for correction of the angular transmission error of the reducer 510. Specifically, the measurement operation instruction step S101 includes a measurement axis designation step S102 in the measurement operation, an input rotation angular range designation step S103 in the measurement operation, and an operation angular velocity designation step S104 in the measurement operation.

Figure 9:
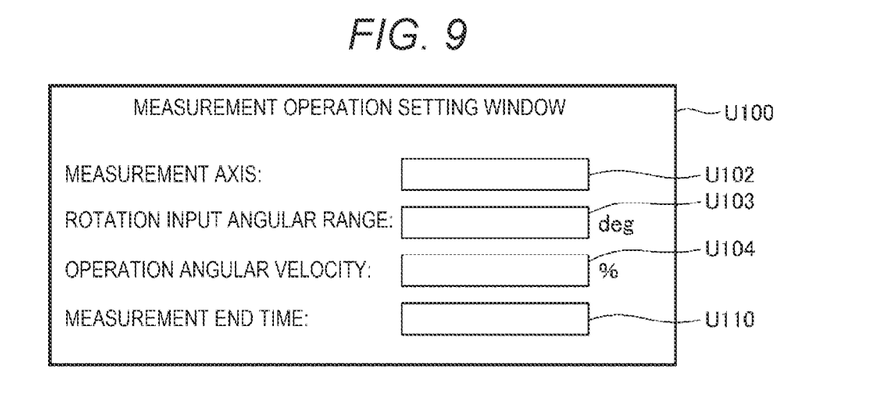
FIG. 9 shows an example of a user interface displayed on a display device at a measurement operation instruction step shown in FIG. 8.

FIG. 9 shows an example of a user interface U100 displayed on the display device 605 at the measurement operation instruction step S101 shown in FIG. 8. The user interface U100 includes a measurement axis input window U102, an input rotation angular range input window U103, an operation angular velocity input window U104, and a measurement end time display window U110.

The measurement axis input window U102 is a text box receiving input of a designated value by the user with respect to the number that specifies the reducer 510 creating correction data or the like when there are a plurality of measurement axes as objects of measurement operation, i.e., a plurality of reducers 510 as objects for which the correction data is created. The input rotation angular range input window U103 is a text box receiving input of a designated value by the user with respect to the input rotation angular range of the reducer 510 as the object in the measurement operation. The operation angular velocity input window U104 is a text box receiving input of a designated value by the user with respect to the operation angular velocity of the reducer 510 as the object in the measurement operation.

At the measurement operation instruction step S101, the command generation section 620 of the computer 600 controls the display device 605 to display the user interface U100.

At the measurement axis designation step S102, the input of the designated value of the measurement axis by the user is received from the input device 604. When the user inputs the number of the measurement axis as the object of the measurement operation or the like to the measurement axis input window U102, the parameter determination section 640 acquires the measurement axis.

At the input rotation angular range designation step S103, the input of the designated value of the input rotation angular range by the user is received from the input device 604. When the user inputs the input rotation angular range to the input rotation angular range input window U103, the parameter determination section 640 acquires the input rotation angular range.

At the operation angular velocity designation step S104, the input of the designated value of the operation angular velocity by the user is received from the input device 604. When the user inputs the operation angular velocity to the operation angular velocity input window U104, the parameter determination section 640 acquires the operation angular velocity.

When the respective designated values are input, the computer 600 transmits a control signal to instruct the measurement operation of the angular transmission error to the controller 300. The functional section of the computer 600 creating the control signal is "command generation section 620" in FIG. 1. Further, in the controller 300, the functional section receiving the control signal is "receiving section 340" in FIG. 1.

After the end of the above described measurement operation instruction step S101, the process goes to a threshold value setting step S105.

At the threshold value setting step S105, the command generation section 620 sets a threshold value as a reference for determination at the index determination step S114, which will be described later. Specifically, the time when the angular transmission error of the reducer 510 is measured or the angular range in which the angular transmission error of the reducer 510 is measured is used as an index. Then, an accumulated value of these indexes is obtained and, at the index determination step S114 to be described later, whether or not the accumulated value is equal to or larger than the threshold value is determined.

In the embodiment, as an example, the time when the angular transmission error of the reducer 510 is measured is used as the index. When the time is used as the index, the measurement and the acquisition of the measurement value are easier and the accumulated value of the times may be easily obtained. As below, the case where the time is used as the index will be explained, however, the following explanation can be applied to a case where the angular range is used as the index.

When the correction data is calculated from the measurement values of the angular transmission error of the reducer 510, the angular transmission error is measured over the wider angular range, the obtained measurement values are used, and thereby, highly accurate correction data is obtained. In this specification, the input rotation angular range of the input shaft 511 necessary for obtaining the sufficiently accurate correction data is referred to as "necessary input rotation angular range".

To calculate highly accurate correction data, the measurement may be performed in the necessary input rotation angular range, and the operation angular range of the arm 110 is wider. Then, depending on the installation environment of the robot 100, an interference between the arm 110 and an object or the like may occur. Accordingly, in the embodiment, not a single measurement is performed in the necessary input rotation angular range, but measurements in smaller input rotation angular ranges than the necessary input rotation angular range are accumulated and measurement values necessary for deriving sufficiently accurate correction data are obtained. Thereby, even in an environment in which the operation angular range of the arm 110 is not sufficiently widely secured, the measurement of the angular transmission error of the reducer 510 for obtaining the sufficiently accurate correction data may be performed.

Here, the measurement time necessary for the measurement in the necessary input rotation angular range may be calculated based on the operation angular velocity input at the above described operation angular velocity designation step S104. Hereinafter, the measurement time is referred to as "necessary measurement time". The necessary measurement time may be obtained by division of the necessary input rotation angular range by the operation angular velocity. In the embodiment, the necessary measurement time is used as the threshold value. The command generation section 620 calculates the threshold value based on the input designated value.

The threshold value is obtained, and thereby, the end time of the measurement operation may be calculated. The command generation section 620 approximately calculates the measurement end time and displays the time in the measurement end time display window U110 and reports the time to the user. The measurement end time is displayed, and thereby, convenience of the user is increased.

At an initialization step S106, the command generation section 620 initializes the accumulated value of the indexes, i.e., the accumulated value of the measurement times to zero.

2.2. First Measurement Operation Execution Step

As below, the explanation will be made with the first measurement operation execution step as "measurement operation execution step S108" and the second and subsequent measurement operation execution steps as "measurement operation execution steps S118".

At the measurement operation execution step S108, the receiving section 340 of the controller 300 receives the control signal output from the command generation section 620, and thereby, the control section 320 controls the robot 100 to perform measurement operation. Specifically, at the measurement operation execution step S108, the control section 320 executes the first measurement operation with the measurement axis, the input rotation angular range, and the operation angular velocity designated by the user. Then, the angular transmission error is calculated from the measurement values and the accumulated value of the measurement times is calculated.

In the embodiment, the rotary joint X11 containing the reducer 510 is designated as the measurement axis. Then, the rotation angular range in which the input shaft 511 rotates through 180 degrees or more is designated as the input rotation angular range. When the reducer 510 is the wave gear reducer, for example, at each time when the input shaft 511 rotates through 180 degrees, a change for one period is generated in the angular transmission error. Accordingly, the input rotation angular range is set to the rotation angular range in which the input shaft 511 rotates through 180 degrees or more, and thereby, the measurement values for calculation of the sufficiently accurate correction data are obtained.

The operation angular velocity is set to a constant rotation angular velocity (constant velocity) and, specifically, is preferably 100°/sec or less. The measurement operation is performed with the input shaft 511 moving at the constant rotation angular velocity, and thereby, the measurement values for calculation of more highly accurate correction data are obtained. Note that the constant rotation angular velocity refers to a condition in which the swing width of the rotation angular velocity of the input shaft 511 is 5°/sec or less.

In the embodiment, as described above, the smaller value than the necessary input rotation angular range is designated as the input rotation angular range. Thereby, the measurement values that enable calculation of correction data with the accuracy equal to that when the measurement operation is performed in the necessary input rotation angular range may be obtained without widening of the operation angular range of the arm 110. As a result, the highly accurate correction data may be finally obtained without restriction on the installation environment of the robot system 1.

The measurement operation execution step S108 has an angular transmission error measurement step S110 and an accumulated value calculation step S112.

2.2.1. First Angular Transmission Error Measurement Step

At the angular transmission error measurement step S110, the angular transmission error of the reducer 510 is calculated based on the output value of the encoder 420 and the output value of the inertial sensor 130.

While the first measurement operation is executed, the control section 320 acquires the output value of the encoder 420, i.e., the angular position of the input shaft 511. Further, while the first measurement operation is executed, the control section 320 acquires the output value of the inertial sensor 130, i.e., the rotation angular position of the output shaft 512. The respective rotation angular positions acquired by the control section 320 are also transmitted to the computer 600.

The above described measurement operation is performed, and thereby, the parameter determination section 640 calculates the angular transmission error, and calculates both the angular transmission error and the measurement time. For example, the calculation of the angular transmission error and the calculation of the measurement time may be performed in the following manner.

First, the parameter determination section 640 acquires the output value of the encoder 420 with a predetermined control period. Thereby, the parameter determination section 640 acquires a sample number N of the output values of the encoder 420. Then, the parameter determination section 640 calculates a product $\Delta t \times N$ of the sample number N and a control period $\Delta t$. The measurement time is obtained using the product $\Delta t \times N$.

Further, a difference between the current output value from the encoder 420 and the output value of the encoder 420 in the previous control period $\Delta t$ is divided by the control period $\Delta t$, and thereby, the current rotation angular velocity of the input shaft 511 may be calculated.

On the other hand, when the inertial sensor 130 is e.g. a gyro sensor, the current rotation angular velocity of the output shaft 512 may be calculated based on the current output value from the inertial sensor 130.

Then, the parameter determination section 640 may calculate the current angular transmission error by obtainment of a difference between an ideal rotation angular velocity of the output shaft 512 theoretically calculated from the current rotation angular velocity of the input shaft 511 and the current rotation angular velocity of the output shaft 512. In this manner, the angular transmission error is calculated with respect to each control period Δt and absolute values thereof are summed in the entire measurement time. This is referred to as "absolute value sum Asum" of the angular transmission errors. The sum Asum is divided by the sample number N, and thereby, an average value D of the angular transmission errors in the measurement time is obtained. The average value D of the measured angular transmission errors is recorded in the memory section 660.

2.2.2. First Accumulated Value Calculation Step

At the accumulated value calculation step S112, the parameter determination section 640 adds the measurement time obtained at the angular transmission error measurement step S110 to the accumulated value of the indexes, i.e., the accumulated value of the measurement times. Thereby, the accumulated value of the measurement times is updated. Note that the accumulated value of the measurement times is initialized to zero at the above described initialization step S106, and the added measurement value is the accumulated value of the measurement times at the first accumulated value calculation step S112.

2.3. First Index Determination Step

At the index determination step S114, whether or not the accumulated value of the indexes is equal to or larger than the threshold value is determined. As described above, the threshold value according to the embodiment is the measurement time necessary for calculation of the sufficiently accurate correction data. Therefore, at the index determination step S114, whether or not the accumulated value of the measurement times is equal to or larger than the threshold value is determined.

When the accumulated value of the measurement times is equal to or larger than the threshold value, the process goes to the correction data creation step S130. When the accumulated value of the measurement times is smaller than the threshold value, the process goes to the second measurement operation execution step S118.

2.4. Second and Subsequent Measurement Operation Execution Steps and Index Determination Steps Each of the second and subsequent measurement operation execution steps S118 has an angular transmission error measurement step S120 and an accumulated value calculation step S122. At the second and subsequent measurement operation execution steps S118, like the first measurement operation execution step S108, the measurement operation is performed and the average value D of the measured angular transmission errors is recorded in the memory section 660. Further, the accumulated value of the measurement times is updated. Then, the determinations are performed with respect to the updated accumulated values at second and subsequent index determination steps S124.

Through the above described series of steps, the average value D of the measured angular transmission errors is updated until the accumulated value of the measurement times becomes equal to or larger than the threshold value. Thereby, the number of measurement values for obtainment of the average value D of the angular transmission errors is a sufficiently large number. As a result, the average value may be obtained from the sufficient number of measurement values, and the reliability of the average value may be increased.

2.5. Correction Data Creation Step

In the embodiment, it is assumed that the change of the angular transmission error has a sinusoidal waveform based on the periodically changing angular transmission error of the reducer 510. In this case, the theoretically obtained change of the angular transmission error is expressed by the following expression.

$$A\sin\left\{2\pi\left(\frac{\theta}{T} + \frac{\phi}{360}\right)\right\}$$

In this expression, A is amplitude of the angular transmission error, θ is the angular position of the input shaft 511 of the reducer 510, T is a period of the angular transmission error, and φ is a phase value.

At the above described initialization step S106, initially, the amplitude A of the angular transmission error is set to A1 and the phase value φ is set to φ1. The amplitude A1 and the phase value φ1 in the initial settings may be arbitrary values or values obtained from the past record, however, the amplitude A1 in the initial settings is preferably a value assumed to be sufficiently large relative to the calculated correction value. The period T of the angular transmission error is determined by the structure of the reducer 510.

At the stage of the correction data creation step S130, the parameter determination section 640 measures the angular transmission error in the amplitude A1 of the angular transmission error and the phase value φ1. Thereby, the parameter determination section 640 may determine a relationship between the amplitude A1 and the phase value φ1 and the change of the angular transmission error based on the above expression. Then, the parameter determination section 640 stores a parameter expressing the relationship in the memory section 360 of the controller 300.

The correction unit 328 calculates the angular transmission error according to the angular position θ of the input shaft 511 of the reducer 510 based on the parameters stored in the memory section 360 and the above expression. Then, correction is performed to subtract the calculated angular transmission error from the output value of the encoder 420 (the latest rotation angular position). The calculated angular transmission error is the position correction signal (correction data) shown in FIG. 2. The position control unit 324 receives the signal corrected to subtract the position correction signal from the latest rotation angular position as position feedback. Further, the velocity control unit 326 receives the signal corrected to subtract the velocity correction signal (correction data) from the latest rotation angular velocity as velocity feedback. The correction unit 328 outputs the differential value of the position correction signal as the velocity correction signal.

As described above, the control apparatus 700 has the function of creating the correction data based on the calculated angular transmission error and corrects the rotation angular position of the input shaft 511 of the reducer 510 based on the correction data.

The calculation of the angular transmission error using the above expression is performed while the phase value φ is changed, and thereby, the angular transmission error with respect to each phase value ϕ may be obtained.

Figure 10:
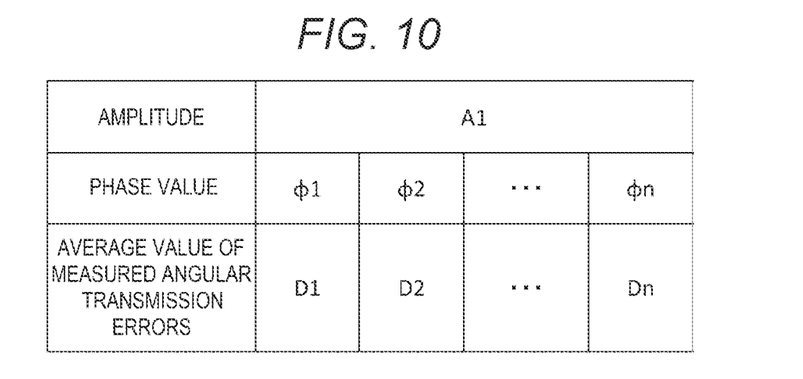
FIG. 10 shows an example of a correction value table created at a correction data creation step shown in FIG. 8.

FIG. 10 shows an example of a correction value table created at the correction data creation step S130 shown in FIG. 8. FIG. 10 is a table showing a list of average values D1, D2, D3, . . . , Dn of the angular transmission errors measured when the amplitude A of the angular transmission error is fixed to A1 and the phase value ϕ is changed to ϕ1, ϕ2, . . . , ϕn.

The average values D of the angular transmission errors are acquired while the phase value ϕ is changed by e.g. 1°, and thereby, the correction value table shown in FIG. 10 may be created. As described above, the average values D of the angular transmission errors are average values of the angular transmission errors obtained by repetition of the measurement operation until the accumulated value of the measurement times becomes equal to or larger than the threshold value. Accordingly, though the input rotation angular range for single measurement is smaller, the measurements are accumulated, and the average values D of the angular transmission errors may be obtained at equal accuracy as that when the measurements are performed in the necessary input rotation angular range. Thereby, even in an environment in which it is hard to secure the operation angular range of the arm 110 to be sufficiently wide, the rotation angular position of the arm 110 may be corrected with higher accuracy. Further, using the correction value table, processing of the correction may be performed with lower load.

Then, when the robot 100 is operated, the control section 320 calculates the change of the angular transmission error with respect to the angular position θ based on the relationship between the phase value ϕ and the average value D of the angular transmission errors shown in FIG. 10 and the above expression. Specifically, the control section calculates the change of the angular transmission error that should be generated by the correction unit 328 with respect to the angular position θ using the phase value ϕ when the average value D of the angular transmission errors is the minimum based on the above expression using the phase value ϕ. Then, the control section generates correction data including the position correction signal and the velocity correction signal based on the obtained change of the angular transmission error. Thereby, the rotation angular position of the arm 110 may be corrected with higher accuracy.

As described above, the method of correcting the angular transmission error for the reducer according to the embodiment is the method of creating the correction data for correction of the angular transmission error of the reducer 510 in the robot system 1 including the arm 110, the reducer 510, the motor 410, the encoder 420, and the inertial sensor 130. The reducer 510 has the input shaft 511 and the output shaft 512 coupled to the arm 110. The motor 410 is coupled to the input shaft 511 and generates power for rotating the arm 110 via the reducer 510. The encoder 420 detects the rotation angular position of the input shaft 511. The inertial sensor 130 is provided in the arm 110 and detects the rotation angular velocity of the arm 110.

Further, the correction method has the measurement operation execution step S108, the angular transmission error measurement step S110, the index determination step S114, the measurement operation execution step S118, and the correction data creation step S130. At the measurement operation execution step S108, the arm 110 is rotated in the input rotation angular range smaller than the necessary input rotation angular range of the input shaft 511 necessary for creation of the correction data. At the angular transmission error measurement step S110, when the arm 110 rotates in the input rotation angular range, the angular transmission error of the reducer 510 is measured based on the output value of the encoder 420 and the output value of the inertial sensor 130 and recorded. At the index determination step S114, using the time when the angular transmission error of the reducer 510 is measured or the angular range in which the angular transmission error of the reducer 510 is measured as the index, whether or not the accumulated value of the indexes is equal to or larger than the predetermined value (threshold value) is determined. When the accumulated value of the indexes is smaller than the predetermined value, at the second and subsequent measurement operation execution steps S118, the angular transmission error of the reducer 510 is measured again and the record is updated. Updating refers to rewriting of the record stored in the memory section 660 with the new record. When the accumulated value of the indexes is equal to or larger than the predetermined value, at the correction data creation step S130, the correction data is created based on the recorded angular transmission error of the reducer 510.

According to the configuration, even when the input rotation angular range for single measurement is set to be smaller than the necessary input rotation angular range, measurement data that enables creation of sufficiently accurate correction data may be obtained. As a result, even in an environment in which it is hard to secure the operation angular range of the arm 110 to be sufficiently wide, the angular transmission error of the reducer 510 may be accurately corrected based on the highly accurate correction data. Further, the robot system 1 that can perform highly accurate operation of the arm 110 may be realized.

In the embodiment, when the input shaft 511 is operated at the constant rotation angular velocity, the angular transmission error of the reducer 510 is measured. Thereby, swing of the parameters including the amplitude and the period indicating the change of the angular transmission error may be suppressed to be smaller, and correction data with particularly high accuracy may be calculated.

In the embodiment, the time necessary for measurement of the angular transmission error of the reducer 510 is calculated based on the rotation angular velocity of the input shaft 511 and reported. Thereby, the user may easily predict the time when the measurement operation ends and the convenience increases.

In the embodiment, the gyro sensor is used as the inertial sensor 130. The gyro sensor can directly output the rotation angular velocity of the arm 110, and thereby, may calculate the angular transmission error more easily by arithmetic operation with the rotation angular velocity obtained from the output value of the encoder 420.

The robot system 1 according to the embodiment includes the arm 110, the reducer 510, the motor 410, the encoder 420, the inertial sensor 130, and the control apparatus 700. The reducer 510 has the input shaft 511 and the output shaft 512 coupled to the arm 110. The motor 410 is coupled to the input shaft 511 and generates power for rotating the arm 110 via the reducer 510. The encoder 420 detects the rotation angular position of the input shaft 511. The inertial sensor 130 is provided in the arm 110 and detects the rotation angular velocity of the arm 110. The control apparatus 700 has the function of creating the correction data for correction of the angular transmission error of the reducer 510.

The control apparatus 700 rotates the arm 110 in the input rotation angular range smaller than the necessary input rotation angular range of the input shaft 511 necessary for creation of the correction data. Further, when the arm 110 rotates in the input rotation angular range, the control apparatus 700 measures and records the angular transmission error of the reducer 510 based on the output value of the encoder 420 and the output value of the inertial sensor 130. Furthermore, using the time when the angular transmission error of the reducer 510 is measured or the angle at which the angular transmission error of the reducer 510 is measured as the index, the control apparatus 700 determines whether or not the accumulated value of the indexes is equal to or larger than the predetermined value (threshold value). In addition, when the accumulated value of the indexes is smaller than the predetermined value, the control apparatus 700 measures the angular transmission error of the reducer 510 and updates the record and, when the accumulated value of the indexes is equal to or larger than the predetermined value, creates the correction data based on the recorded angular transmission error of the reducer 510.

According to the configuration, the robot system 1 that can obtain measurement values that enables creation of sufficiently accurate correction data even when the input rotation angular range for single measurement is set to be smaller than the necessary input rotation angular range may be realized. According to the robot system 1, even in an environment in which it is hard to secure the operation angular range of the arm 110 to be sufficiently wide, the rotation angular position of the output shaft 512 of the reducer 510 may be accurately corrected based on the highly accurate correction data. As a result, the robot system 1 that can perform highly accurate operation of the arm 110 may be realized.

As above, the method of correcting the angular transmission error for the reducer and the robot system according to the present disclosure are explained based on the illustrated embodiments, however, the present disclosure is not limited to those. For example, the method of correcting the angular transmission error for the reducer according to the present disclosure may be a method formed by addition of a step for an arbitrary purpose to the above described embodiment.

In the robot system according to the present disclosure, the configuration of the above described embodiment may be replaced by an arbitrary configuration having the same function, or another arbitrary configuration may be added to the above described embodiment. Note that the robot of the robot system may be a vertical articulated robot or a dual-arm robot having a plurality of the above described arms, or a scalar robot having a plurality of the above described arms. Alternatively, the number of arms of the robot is not particularly limited.

What is claimed is:

1. A method of correcting an angular transmission error for a reducer of creating correction data for correction of an angular transmission error of the reducer in a robot system including
   an arm,
   the reducer having an input shaft and an output shaft coupled to the arm,
   a motor coupled to the input shaft and generating power for rotating the arm via the reducer,
   an encoder detecting a rotation angular position of the input shaft, and
   an inertial sensor provided in the arm and detecting a rotation angular velocity of the arm,
   the method comprising:
   rotating the arm in an input rotation angular range smaller than a necessary input rotation angular range of the input shaft necessary for creation of the correction data;
   when the arm rotates in the input rotation angular range, measuring and recording the angular transmission error of the reducer based on an output value from the encoder and an output value from the inertial sensor;
   using a time when the angular transmission error of the reducer is measured or an angular range in which the angular transmission error of the reducer is measured as an index, determining whether or not an accumulated value of the indexes is equal to or larger than a predetermined value;
   when the accumulated value of the indexes is smaller than the predetermined value, measuring the angular transmission error of the reducer and updating a record; and
   when the accumulated value of the indexes is equal to or larger than the predetermined value, creating the correction data based on the recorded angular transmission error of the reducer.

2. The method of correcting the angular transmission error for the reducer according to claim 1, wherein
   when the input shaft is operated at a constant rotation angular velocity, the angular transmission error of the reducer is measured.

3. The method of correcting the angular transmission error for the reducer according to claim 2, wherein
   a time taken for measurement of the angular transmission error of the reducer is calculated based on the input rotation angular range of the input shaft and the rotation angular velocity of the input shaft and reported.

4. The method of correcting the angular transmission error for the reducer according to claim 1, wherein
   the index is a time when the angular transmission error of the reducer is measured.

5. The method of correcting the angular transmission error for the reducer according to claim 1, wherein
   the inertial sensor is a gyro sensor.

6. A robot system comprising:
   an arm;
   a reducer having an input shaft and an output shaft coupled to the arm;
   a motor coupled to the input shaft and generating power for rotating the arm via the reducer;
   an encoder detecting a rotation angular position of the input shaft;
   an inertial sensor provided in the arm and detecting a rotation angular velocity of the arm; and
   a control apparatus creating correction data for correction of the angular transmission error of the reducer, wherein
   the control apparatus rotates the arm in an input rotation angular range smaller than a necessary input rotation angular range of the input shaft necessary for creation of the correction data, when the arm rotates in the input rotation angular range, measures and records the angular transmission error of the reducer based on an output value from the encoder and an output value from the inertial sensor, using a time when the angular transmission error of the reducer is measured or an angle at which the angular transmission error of the reducer is measured as an index, determines whether or not an accumulated value of the indexes is equal to or larger than a predetermined value, when the accumulated value of the indexes is smaller than the predetermined value, measures the angular transmission error of the reducer and updates a record, and, when the accumulated value of the indexes is equal to or larger than the predetermined value, creates the correction data based on the recorded angular transmission error of the reducer.

* * * * *